Jan. 17, 1933.  J. W. SHAW  1,894,574
GEARLESS TRANSMISSION
Filed April 27, 1931  3 Sheets-Sheet 1

Fig. 2.ᵃ

Inventor,
John W. Shaw.
By H. H. Byrne
Attorney

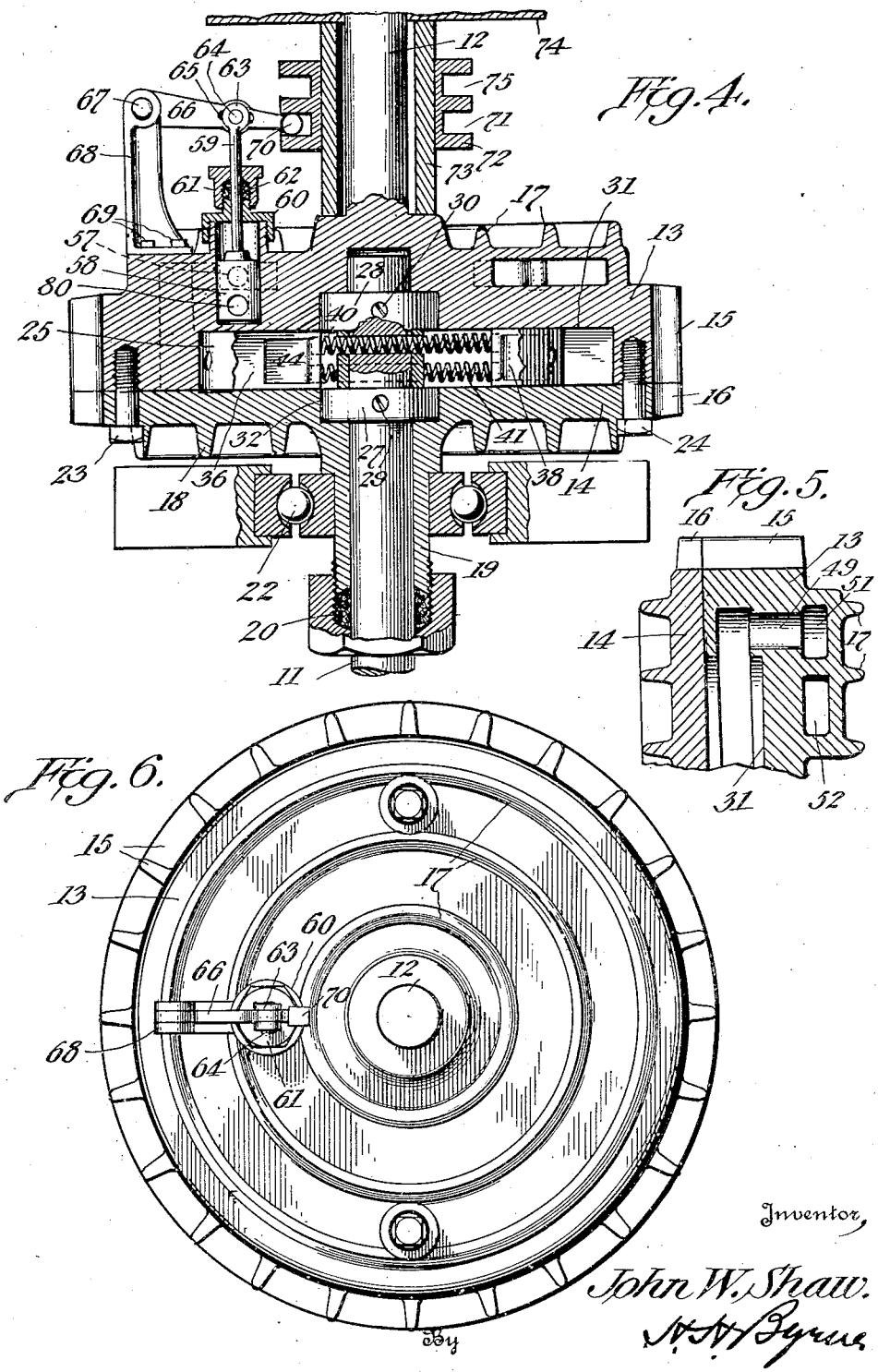

Jan. 17, 1933.  J. W. SHAW  1,894,574
GEARLESS TRANSMISSION
Filed April 27, 1931  3 Sheets-Sheet 3
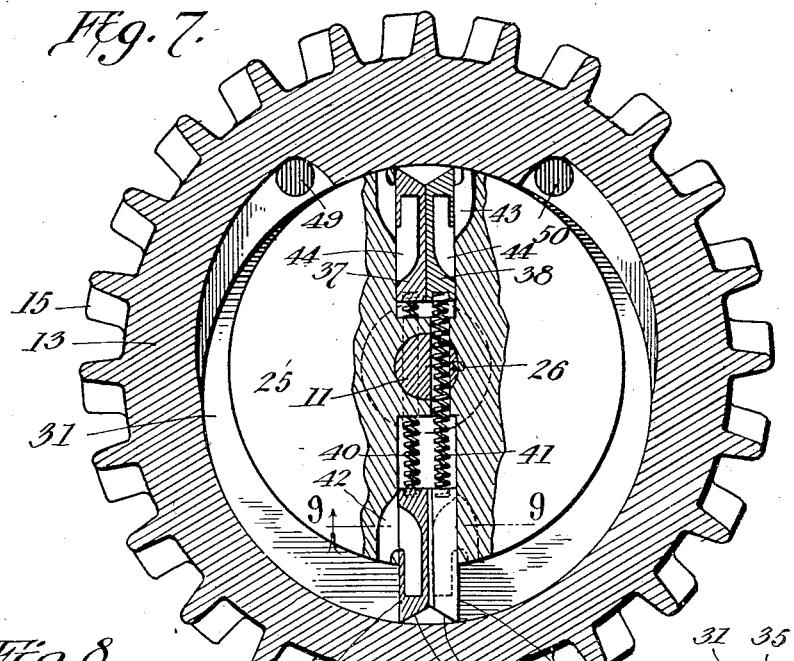
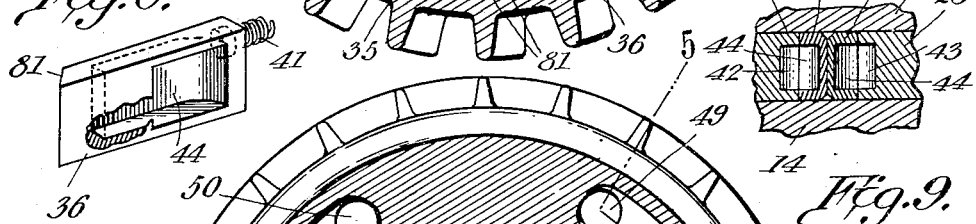
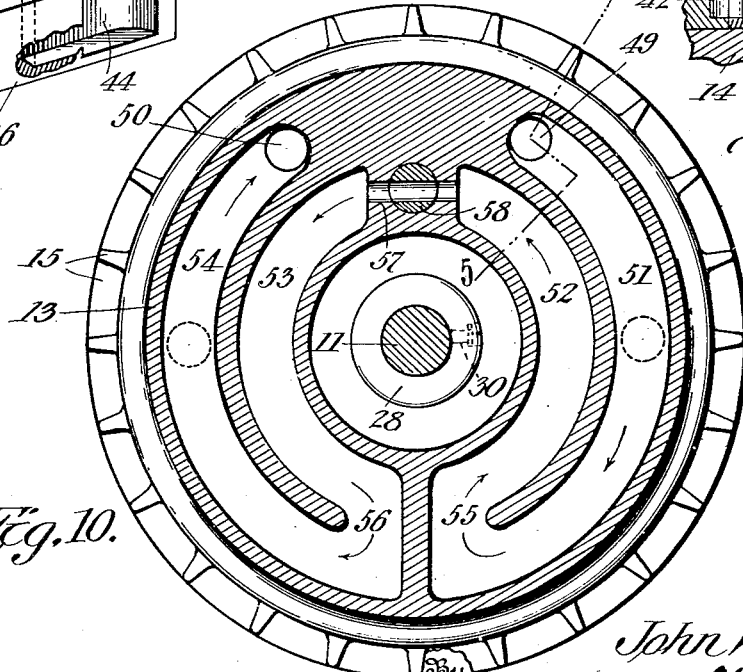
Inventor,
John W. Shaw.
Attorney Patented Jan. 17, 1933

1,894,574

UNITED STATES PATENT OFFICE

JOHN W. SHAW, OF SAN FRANCISCO, CALIFORNIA

GEARLESS TRANSMISSION

Application filed April 27, 1931. Serial No. 533,217.

The present invention relates to gearless transmissions and consists in the novel combinations and arrangements of elements hereinafter described and particularly set forth in the accompanying claim.

The purpose of the invention is to provide a gearless transmission comprising a casing having a rotary piston disc with radially movable vanes cooperable with a fluid medium to transmit power from a driving to a driven shaft, and wherein the maximum efficiency is developed from the power source.

A further purpose of the invention is in providing a rotary piston element for the transmission having radially movable vanes, each formed with a chamber having a communicating duct whereby fluid pressure will be admitted to the chamber in each vane to assist in forcing it in fluid-tight relation against the inner wall of the casing thereby avoiding loss of power otherwise due to leakage.

Summarily stated the invention embodies a gearless transmission which permits readily performing the functions ordinarily accomplished by a clutch and speed change gear without requiring the use of actual gears or clutch members in the usually understood meaning of said terms.

Further advantages of the invention will be apparent from the following detailed description and inspection of the accompanying drawings, wherein.

Figure 2:
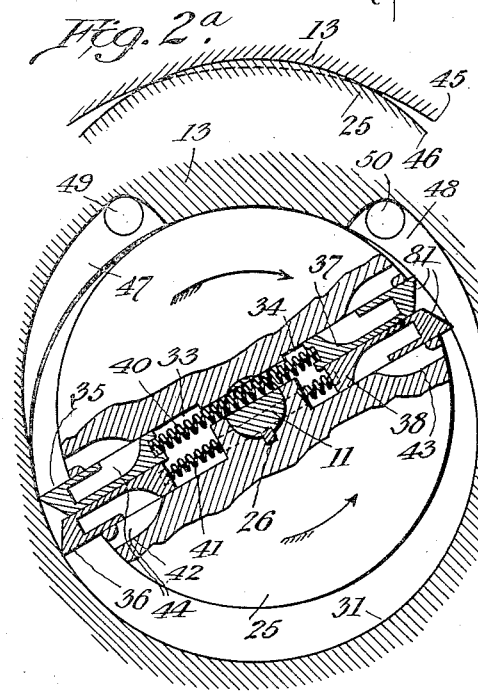
Figures 2 and 3 are sectional diagrams illustrating the structure of the piston and vanes, and showing same in different positions.
Figure 3:
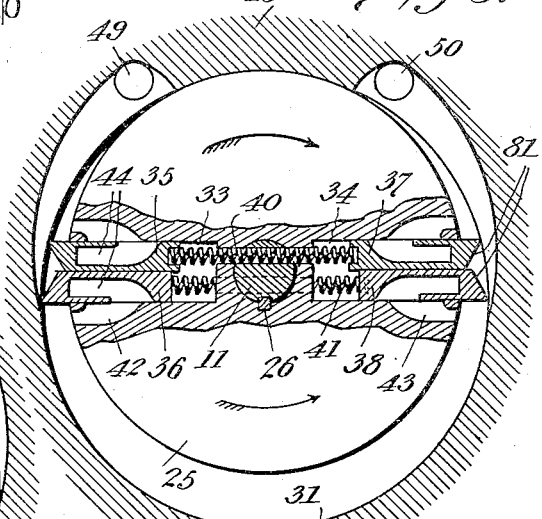

Figure 2* a diagram showing the nature of the contact between the piston disc and casing shown in Figures 2 and 3.

Figure 4 a longitudinal section, partly in elevation, through the transmission on a central plane.

Figure 5 a sectional detail on line 5—5 of Figure 10.

Figure 1:
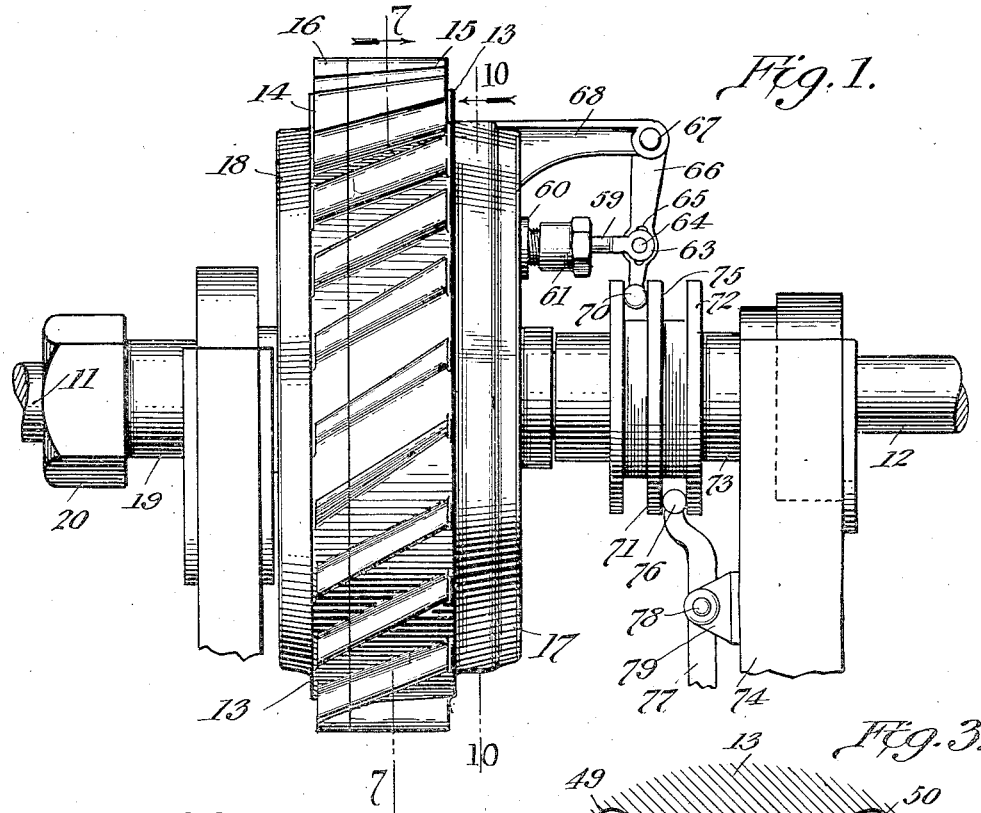
Figure 1 is a side elevation showing the gearless transmission.

Figure 6 an end view of the transmission from the right of Figure 1, the support being omitted to show the remaining structure more clearly.

Figure 7 a cross section through the transmission on the plane indicated by the line 7—7 of Figure 1.

Figure 8 a perspective view partly broken away showing one of the vanes.

Figure 9 a detail sectional view on the line 9—9 of Figure 7, and;

Figure 10 a sectional view of the transmission on the plane indicated by line 10—10 of Figure 1.

Referring to the construction in further detail, and wherein similar reference numerals designate corresponding parts in the different figures shown, the transmission comprises a driving shaft 11 and a driven shaft 12 arranged in alinement, and secured to shaft 12 is a casing 13 having a tightly fitting cover portion 14. Cooling ribs 15 are provided upon the periphery of the casing 13 and corresponding ribs 16 on the portion 14 form continuations of the ribs 15 as shown. These cooling ribs are arranged at an inclination or diagonally to the direction of the shafts 11 and 12 so as to produce air currents when the casing is rotated. Additional cooling ribs 17, annular and concentric, are provided upon the outer face of the part 13 and corresponding ribs 18 are formed on the cover 14. Said cover 14 has a tubular extension 19 receiving the shaft 11 as best shown in Figure 4, and a packing nut 20 cooperating with said tubular extension produces a fluid-tight joint between the shaft 11 and the sleeve 19. A bearing 22 of ball or roller type serves to support the sleeve 19, although it will be understood any other type of bearing may be employed if preferred.

The casing 13 and cover 14 are suitably secured together by bolts 23 and 24 as shown in Figure 4 or in any other appropriate manner. A disc 25 (Figures 2 and 3) is locked on shaft 11 by a key 26, and on opposite sides of said disc there are collars 27 and 28 secured to the shaft 11 by pins 29 and 30. The chamber 31 (Figures 2, 3, 4 and 7) in the casing is of uniform width, and equal to the thickness of the disc or piston 25, so that a practically fluid-tight seal will be formed between the sides of the disc and the top and bottom of the chamber when the disc is in working position.

In assembling the transmission the shaft 11 is first inserted through the sleeve 19 and stuffing box 20 until it projects a suitable distance beyond the inner surface of the cover 14 when the collar 27 is secured thereon by means of the pin 29. The disc 25 is then applied with the key 26 and the whole secured by the collar 28 and its pin 30. In this way the disc is rigidly fastened to the shaft and both collars 27 and 28 will assist in maintaining it in proper position. Said collar 27 also cooperates with the counter-bore 32 of the cover plate 14 to assist in producing a fluid-tight seal between the shaft 11 and the sleeve 19. However, this alone is not relied upon since use is made of the stuffing box 20 cooperating with the sleeve 19 for the purpose of sealing the joint and yet allowing shaft 11 to revolve with respect to cover plate 14.

As shown in Figures 2, 3, 4 and 7 the disc 25 is provided with recesses or chambers 33 and 34 arranged diametrically opposite one another, and two vanes or pistons 35 and 36 are fitted back-to-back in recess 33, and similar vanes 37 and 38 are arranged correspondingly in recess 34. A spring 40 passing through an aperture in shaft 11 distends or urges the vanes 35 and 37 away from one another, and a similar spring 41 acts against the vanes 36 and 38. Thus when the disc rotates with respect to the casing these springs 40 and 41 will continually maintain the ends of the vanes in contact with the outer surface of the bore and produce a fluid-tight engagement therewith. The recess 33 is enlarged at its outer end as at 42 and the recess 34 is similarly enlarged at 43. Each of the vanes has a recess 44 in open communication with the enlarged part 42 or 43 of said apertures.

It will be noted the shaft 11 is mounted centrally with respect to the exterior of the housing 13, 14, but eccentrically with respect to the bore 31 thereof. This is shown clearly in Figures 2, 3, 4 and 7. The outer surface of the bore 31 may be, and for simplicity of manufacture preferably is cylindrical, and the disc 25 is also cylindrical in outline. However, inasmuch as the diameter of the disc 25 is less than that of the bore 31, if the bore 31 were a circular cylinder throughout its entire periphery, it is clear that the disc 25 could have contact therewith only at a single line, namely the element of tangency of the two cylinders. However, such slight extent of contact, while sufficient mathematically, in practice would cause considerable leakage of fluid between the disc and the bore of the casing. To prevent this the bore of the casing at the part where the disc 25 makes contact therewith is given a different curvature, namely the curvature of the disc itself. This is shown clearly in Figure 2ª which represents the contacting parts of the disc 25 and the casing 13. If said portion 45 be an arc of the same radius as that of the chief part of bore 31 (see Figure 2ª) and part 46 be an arc corresponding to the periphery of the disc 25, it will be noted the two parts (e. g. casing 13 and disc 25) would overlap one another as shown by the portion between the dotted line and the full line illustrated. At this portion, however, the casing 13 is constructed so as to no longer follow the circular arc 45, but the arc 46, namely that corresponding to the piston or disc 25, and thereby a much improved contact is produced between these two portions of the transmission. It will be understood, of course, that Figure 2ª is shown purposely on an exaggerated scale in order to clearly bring out the differences of the two parts and that in practice this difference is much less than here indicated.

In order to transmit a driving force or torque from the shaft 11 to the shaft 12, or vice versa, for it is clear the device can operate with either shaft as the driving or driven element a suitable fluid is introduced into the casing to cooperate with the piston and vanes to produce a transmission of power. If the bore 31 is filled with a liquid, for example oil, and no outlet or communication be provided between the disc and the bore of the casing then such liquid would act practically as a solid, that is to say, it would resist any effort to displace it, and thereby prevent relative motion between the disc and the casing. If, however, communication be provided between these two parts of the bore it becomes possible by suitably restricting or throttling said communication to control the amount of force required to force liquid therethrough and regulate the amount of slippage between the disc and the casing. Use is made of this principle to provide for changing the speed of one shaft 11 or 12 with respect to the other as follows:

The lateral extensions 47 and 48 (see Figure 2) provided at the left and right respectively, near the top of the bore 31 serve as fluid passages permitting a throttling of fluid through the orifices 49 and 50 respectively. Thus it will be seen (Figures 5 and 10) that communication between the orifices 49 and 50 is possible through a circuitous path consisting of the arcuate portions 51, 52, 53 and 54 connected by the radial portions 55, 56 and by restricted passage 57. A valve 58 in the passage 57 varies the extent of opening thereof and by operating said valve the rate of flow of oil or other liquid through this circuitous passage may be regulated at will. The passage is made circuitous in order to provide as long a path as possible for the oil, whereby it may be subjected to the cooling action of the ribs 16 and 17 on the casing. In order to control the extent of valve opening use is made of the valve stem 59, (see Figure 4) passing through a stuffing box comprising a cap 60, gland 61, and packing material 62. The valve stem 59 has a fork or clevis 63 embracing a pin 64 engaging slot 65 in lever 66 pivoted at 67 to a bracket 68 secured by bolts 69 to the casing 13. The end 70 of the lever engages in groove 71 of the member 72 that is slidable on sleeve 73 forming part of the stationary member 74 which supports one of the bearings. Said member 72 has a second groove 75 receiving the end 76 of lever 77, which is pivoted at 78 between ears 79 whereby it becomes possible to shift the sleeve 72 by means of lever 77. Said lever 77 may be controlled in any desired way to actuate the valve 58 so as to displace the bore 80 with respect to the bore 57 constituting the restricted passage (Figure 10). The slot 65 in the lever 66 is provided to prevent binding, and it is obvious that other suitable means could be substituted to accomplish the same function.

In operation the casing is filled with suitable fluid, preferably oil, and the auxiliary chamber comprising the passages 51, 52, 53 and 54, etc. also filled. When the valve 58 is in closed position there will be little or no flow of oil past the ends of the four vanes 35, 36, 37 and 38 so that upon applying a torque to one of the shafts 11 or 12 the same will be transmitted unchanged to the other shaft, thus causing the device to operate as an ordinary clutch without slippage. However, upon slightly opening the valve 58 it will become possible for the apparatus, acting as a pump in the customary way, to cause a circulation of fluid through the circuitous passage and its restricted portion 57, thus producing a slip due to the fluid flow from one side of the chamber 31 to the other, that is from one orifice 49 to the other 50. Therefore, the speeds of the two shafts 11 and 12 will now differ from one another and this difference may be varied at will by suitably controlling the extent of opening of valve 58. This is readily accomplished while the device is in rotation by means of the levers 66 and 77, cooperating with the slidable sleeve 72 as already described.

Due to the molecular friction a certain amount of heat will be developed in the liquid, and to assist in dissipating such heat and keep the device cool the ribs 15, 16, 17 and 18 are provided. These create efficient cooling due to the air current set up by said ribs, during the rotation of the casing. The degree of heating is further reduced by reason of the added capacity of the reservoir portion 51, 52, 53 and 54, which stores a sufficient reserve fluid and which is exposed directly to the cooling effect of the ribs 17. As already stated the vanes 35, 36, 37 and 38 will be pressed against the bore of the chamber 31 by several combined effects, namely first, the direct pressure of the compression springs 40 and 41; second, centrifugal force which tends to press the vanes outwardly upon rotation; and thirdly by the pressure of fluid acting against the hollow portion 44 to force said vanes outwardly. Due to the fact that the vanes are arranged in pairs, namely 35 and 36 on the one hand, and 37 and 38 on the other, torque may be transmitted in either direction of rotation.

Inasmuch as friction in this mechanism has been reduced to a minimum and all moving parts are continuously operating under oil, the only losses that occur are those due to the passage of the oil through the conduits, and the slight friction of vanes and other elements against the casing, consequently the device is an efficient gearless transmission which may operate as a speed changing gear or as the equivalent of an ordinary clutch, depending upon the adjustment of the valve 58.

It is to be understood that the invention as here disclosed is not limited to the details of construction shown and described and that these may be varied widely without departing from the spirit of the invention as defined by the claim.

What is claimed as new is:

A gearless transmission comprising a driving shaft and a driven shaft, a fluid-containing casing secured to one of said shafts, a disc rotatable in said casing and secured to the other shaft, said disc having radial slots therein, opposed pairs of vanes in each slot whereby torque may be transmitted in either direction, springs urging the vanes of each slot radially into fluid-tight contact with the inner wall of the casing, each vane having a tapered end adjacent the said inner wall, the said tapers of the two vanes in each slot being directed oppositely to one another, and each vane having a portion of its outer face cut away to provide access of fluid thereto, the parts of the disc adjacent each slot being also cut-away to cooperate therewith.

In witness whereof, I have hereunto set my hand at Washington, District of Columbia, this twenty-second day of January, A. D. nineteen hundred and thirty-one.

JOHN W. SHAW.